United States Patent
Hsiung et al.

(10) Patent No.: US 7,394,178 B1
(45) Date of Patent: Jul. 1, 2008

(54) GENERATOR ROTOR STRUCTURE

(75) Inventors: Tao-Pang Hsiung, Longtan Township, Taoyuan County (TW); Wen-Hsien Chuang, Longtan Township, Taoyuan County (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 0 days.

(21) Appl. No.: 11/698,835

(22) Filed: Jan. 29, 2007

(51) Int. Cl.
*H02K 21/12* (2006.01)

(52) U.S. Cl. .................................. 310/156.12; 310/269

(58) Field of Classification Search ............ 310/156.12, 310/269
See application file for complete search history.

(56) References Cited

U.S. PATENT DOCUMENTS

| 571,462 | A | * | 11/1896 | Thomson et al. ............. 310/218 |
| 4,954,736 | A | * | 9/1990 | Kawamoto et al. ...... 310/156.21 |
| 5,760,520 | A | * | 6/1998 | Hasebe et al. ................ 310/261 |

* cited by examiner

Primary Examiner—Dang D Le
(74) Attorney, Agent, or Firm—Rosenberg, Klein & Lee (57) ABSTRACT

A generator rotor structure comprises a cylinder body, at least a magnetic member, and a shaft. A penetrating bore is adapted at the center of the cylinder body. A plurality of containing spaces is adapted between the sidewall of the penetrating bore and the outer sidewall of the cylinder body. The adjacent containing spaces include a connecting part. The shaft passes through the penetrating bore, and the magnetic member is adapted on the outer sidewall of the cylinder body. The present invention can also be implemented according to another embodiment of the present invention, which comprises a hollow body, at least a connecting part, at least a shaft sleeve, at least a magnetic member, and a shaft. The connecting part is connected on the inner sidewall of the hollow body, and the shaft sleeve is connected to the connecting part. In addition, the shaft passes through the shaft sleeve, and the magnetic member is adapted on the outer sidewall of the hollow body. Thereby the power generated by the generator can be enhanced. Moreover, owing to reduced weight and moment of inertia of the rotor, the power generated by the generator can be increased at low wind speeds.

5 Claims, 6 Drawing Sheets

GENERATOR ROTOR STRUCTURE

FIELD OF THE INVENTION

The present invention relates to a rotor structure, and particularly to a generator rotor structure. The structure can reduce the weight and moment of inertia of the rotor. Thereby, power generated can be enhanced at low wind speeds.

BACKGROUND OF THE INVENTION

At present, the majority of global energy is generated by burning mineral substances such as petroleum or coal. However, such mineral substances are by no means inexhaustible energy. If people rely on burning mineral substances to generate energy, presumably in the near future, the world will come to an energy crisis. In addition, burning mineral substances will also produce considerable $CO_2$ or CO or other gases, affecting the ozone concentrations in the atmosphere. It will increase the average temperatures of the earth, deteriorating the greenhouse effect. Thereby the ice sheet in the North and the South Poles will melt gradually, rising the sea level. It not only reduces the living spaces of humans, but also affects the subsistence of marine organisms. Moreover, reduced ozone concentrations in the atmosphere also lead to incomplete absorbency by the atmosphere of ultraviolet (UV) rays radiated from the sun. Hence, humans tend to get skin cancer if exposed to the UV rays frequently. It not only endangers the ecosystem but also affects human health.

In order to solve current energy crisis, many countries develop actively various types of renewable energy such as wind energy, solar energy, geo-heat energy, and tide energy. Taking wind energy for example, as long as the sun and the earth revolute continuously, the wind power will be inexhaustible. By driving generators by winds, wind energy is converted into electric energy. In the conversion process, no $CO_2$ and any other pollutants will be produced. Accordingly, many countries, such as Denmark, Netherlands, Germany, and the United States, devote themselves into their researches. Normal wind-power generators are comprised of such components or equipments as blades, gearboxes, and generators. Not only the structure and size of the blades but also the capacity of the generators influence the quantity of input wind energy. If the generators themselves consume considerable energy, then extractable electric energy must be quite limited.

Figure 1:
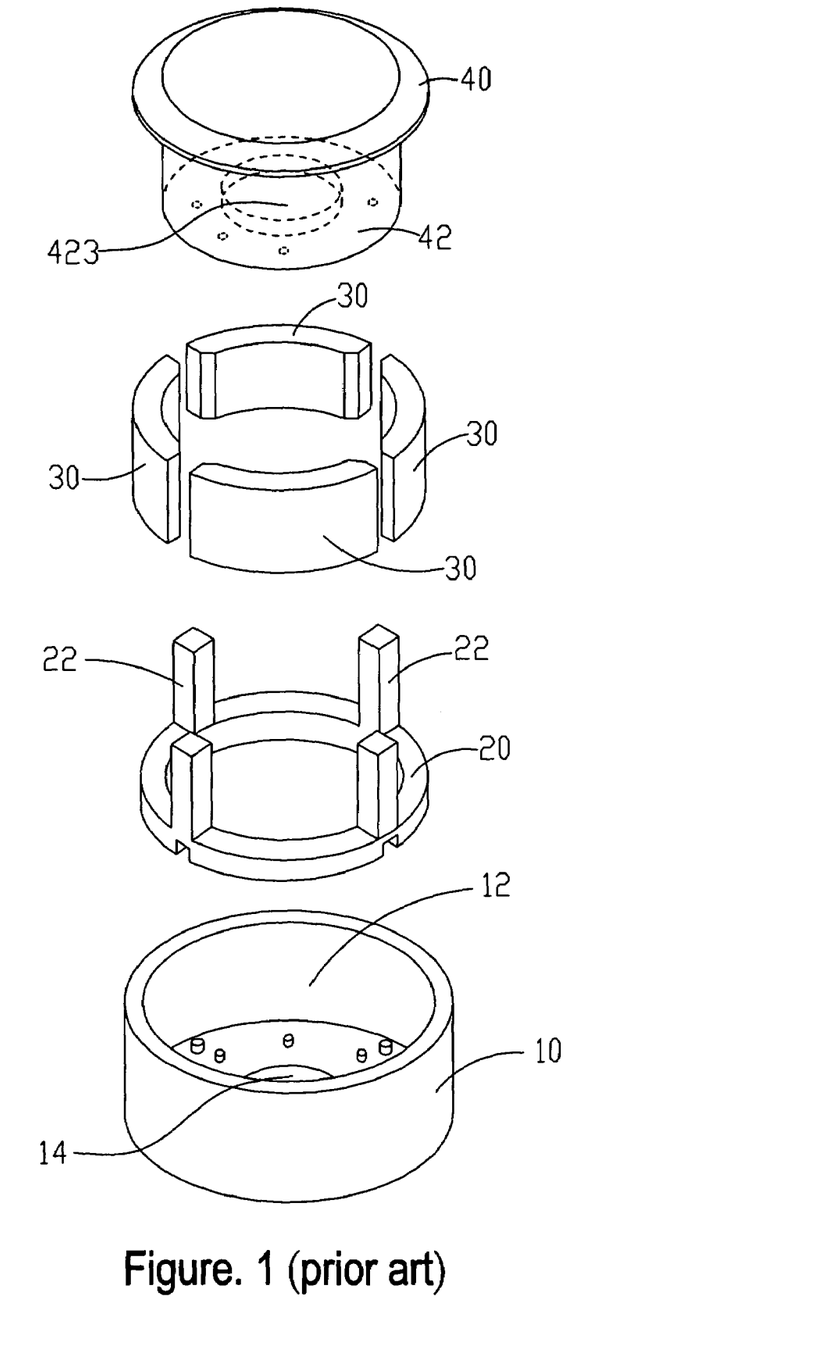
FIG. 1 is an explosion view according to a rotor in prior art.

Please refer to FIG. 1, wherein a rotor of a permanent-magnet generator is described in Taiwan's patent number 262,607. As shown in the figure, the generator rotor according to the prior art includes a yoke 10, a shell 20, a plurality of magnets 30, and a cover 40. The shell 20 is adapted in the yoke 10; the magnets 30 are adapted in the shell 20; and the cover 40 is adapted in the shell 10. The shell 10 is a cylinder. A containing space 12 is adapted in one side of said cylinder, while a penetrating bore is adapted on the other side of said cylinder. The shell 20 is adapted in the containing space 12, and is a ring. A plurality of spacing bars 22 is adapted with intervals between, and is adapted in an extending manner on one side of the ring. The magnets 30 are adapted between adjacent spacing bars 22. The cover 40 is a hollow body. A composite element 42 is adapted on one side of said cover 40. A through hole 423 is adapted on the composite element 42. When the cover 40 is adapted in the yoke 10, the composite element 42 is adapted on the bottom of the containing space 12 such that the penetrating bore 14 is aligned with the through hole 423. Meanwhile, the shell 20 and the magnets 30 are adapted on the outer sidewall of the cover 40.

However, the length of the magnets 30 in the prior art is short, therefore the electric power generated via induction by the generator is limited. Moreover, the rotor has its own weight; thereby it has its own moment of inertia. The more the weight of the rotor, the greater its moment of inertia is. Correspondingly, the greater the moment of inertia of the rotor, the lower the efficiency of conversion from wind power to electric power is. If the electric power induced by the generator can be increased and the efficiency of conversion from wind power to electric power can be enhanced, it is for sure that the power generated by the generator can be increased. In addition, the rotor structure in the prior art is difficult to assemble. It is also quite laborious to change components of the rotor structure.

Accordingly, the present invention provides a generator rotor structure, which is able not only to increase the electric power induced by the generator, but also to reduce the weight and, in turn, the moment of inertia of the rotor such that the power generated by the generator is enhanced. Besides, the assembly is so simple that the assembly efficiency is increased. Thereby, the problems described above can be solved.

SUMMARY

The purpose of the present invention is to provide a generator rotor structure, wherein a plurality of containing spaces is adapted in a cylinder body to reduce its weight. This, in turn, reduces the moment of inertia of the cylinder body. Thereby, the power generated by the generator can be enhanced at low wind speeds.

The other purpose of the present invention is to provide a generator rotor structure, wherein the assembly of magnetic members onto the rotor is made simpler in terms of a plurality of salient parts. Thereby, the assembly efficiency of the rotor can be enhanced.

The generator rotor structure according to the present invention comprises a cylinder body, at least a magnetic member, and a shaft. A penetrating bore is adapted at the center of the cylinder body. A plurality of containing spaces is adapted between the sidewall of the penetrating bore and the outer sidewall of the cylinder body. The adjacent containing spaces include a connecting part. The shaft passes through the penetrating bore, and the magnetic member is adapted on the outer sidewall of the cylinder body. The present invention can also be implemented according to another embodiment of the present invention, which comprises a hollow body, at least a connecting part, at least a shaft sleeve, at least a magnetic member, and a shaft. The connecting part is connected on the inner sidewall of the hollow body, and the shaft sleeve is connected to the connecting part. In addition, the shaft passes through the shaft sleeve, and the magnetic member is adapted on the outer sidewall of the hollow body. Thereby the power generated by the generator can be enhanced. Moreover, owing to reduced weight and moment of inertia of the rotor, the power generated by the generator can be increased at low wind speeds.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 2:
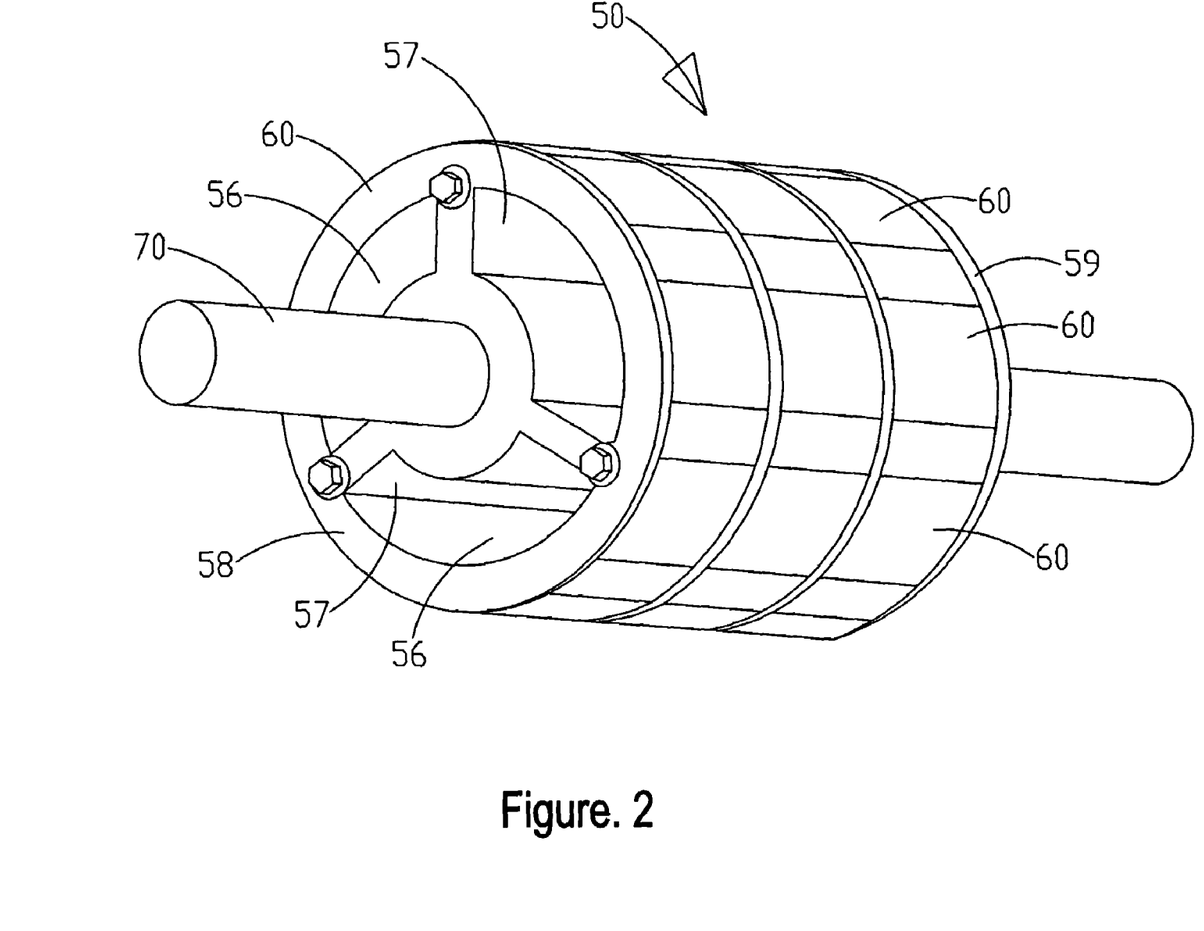
FIG. 2 is a three-dimensional view of a rotor according to a preferred embodiment of the present invention.

Please refer to FIG. 2, which shows a three-dimensional view of a rotor according to a preferred embodiment of the present invention. As shown in the figure, the generator rotor structure according to the present invention comprises a cylinder body 50, at least a magnetic member 60, and a shaft 70. The magnetic member 60 is adapted on the outer sidewall of the cylinder body 50, and is adapted ring-likely on the cylinder body 50 using at least a fixing part 54. Afterwards, a first cover 58 and a second cover 59 are adapted on both sides of the cylinder body 50, and the shaft 70 passes through the cylinder body 50.

Figure 3:
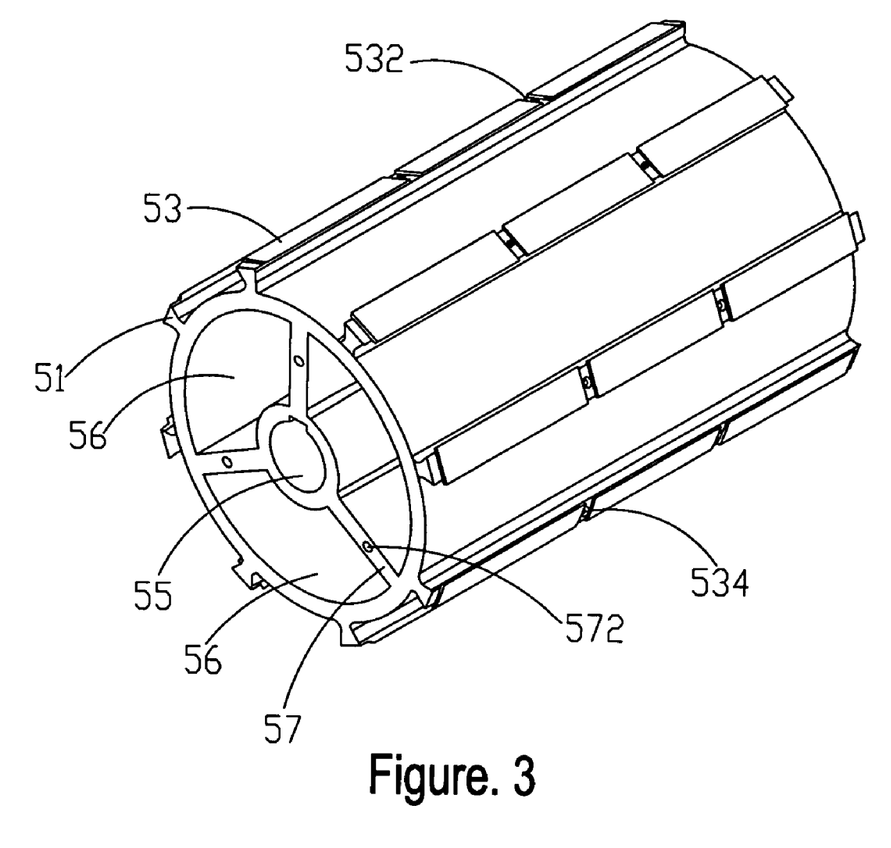
FIG. 3 is a three-dimensional view of a cylinder body according to a preferred embodiment of the present invention.
Figure 4:
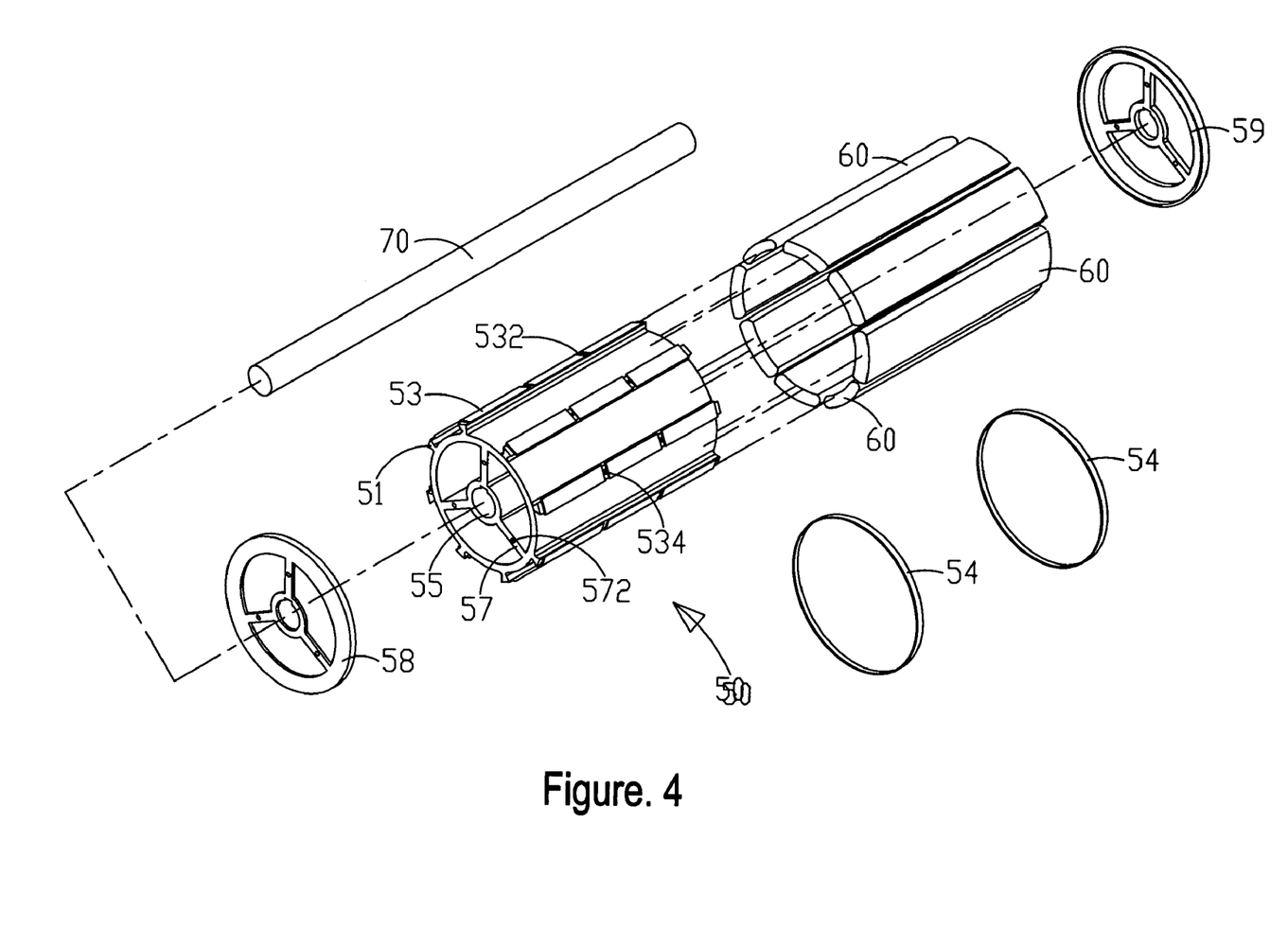
FIG. 4 is an explosion view of a rotor according to a preferred embodiment of the present invention.

Please refer to FIGS. 3 and 4, which show a three-dimensional view of a cylinder body and an explosion view of a rotor according to a preferred embodiment of the present invention. As shown in the figure, a plurality of salient parts 51 is adapted in an extending manner on the outer sidewall of the cylinder body 50. A holding groove 52 is formed between adjacent salient parts 51. The magnetic members 60 are adapted in the holding grooves 52. In order to make the magnetic members be attached firmly on the outer sidewall of the cylinder body 50, the bottom of each of the salient part 51 is made narrower than the top thereof. That is, the bottom of the holding groove 52 is made wider than the top thereof. Alternatively, the shape of the sidewalls of the holding grooves 52 can be made arc-shaped or wedge-shaped so that the edge shapes of the magnetic members 60 match that of the holding grooves 52. Thus, the magnetic members 60 are free from falling off from the cylinder body 50 when the generator rotor rotates.

In order to make sure that the magnetic members 60 do not fall off when the rotor structure operates, at least a holding member 53 is further adapted on top of the salient part 51. The bottom of the holding member 53 is narrower than the top thereof, so that the magnetic members 60 can be further secured in the cylinder body 50. In addition, at least a fixing groove 532 can be further adapted on each of the holding member 53, and the fixing part 54 is adapted ring-likely in the fixing groove 532. Thus, the magnetic members 60 are sure to be tightly attached to the cylinder body 50 when the rotor structure operates. The holding member 53 can be an integral part of the salient part 51. Alternatively, at least a screw hole 534 is adapted on the fixing groove 532. Thereby, the fixing part 54 is adapted ring-likely in the fixing groove 532 more securely by making use of a screw and the screw hole 534.

A penetrating bore 55 is adapted at the center of the cylinder body 50. Said penetrating bore 55 is used to hold the shaft 70 of the rotor. In order to make the shaft 70 adapted more firmly on the cylinder body 50, external threads can be adapted on both sides of the shaft 70. In addition, a plurality of nuts is adapted to said external threads to make the nuts positioned on both sides of the cylinder body 50.

In order to enhance the power generation efficiency of the generator, the height of the cylinder body 50 can be increased as well as making the length of magnetic member 60 and the height of the cylinder body 50 match each other. However, this will lead to an increase in rotor weight, which in turn will increase the moment of inertia of the rotor. Thereby, a plurality of containing spaces 56 is adapted between the sidewall of the penetrating bore 55 and the outer sidewall of the cylinder body 50. The adjacent containing spaces 56 include a connecting part 57. By installing the plurality of containing spaces 56 in the cylinder body 50, the weight of the rotor is reduced, which in turn reduces the moment of inertia of the rotor so that the power generated by the generator is increased.

Covers can also be adapted on both sides of the cylinder body 50. Thereby, the magnetic members 60 are adapted more securely in the holding grooves 52. Accordingly, at least a screw hole 572 is adapted on the connecting part 57. By making use of a screw and the screw hole 572, the first cover 58 and the second cover 59 are installed on both sides of the cylinder body 50.

When assembling the rotor structure, the magnetic members 60 are firstly adapted to the holding grooves 52. Afterwards, the first cover 58 and the second cover 59 are installed on both sides of the cylinder body 50 using screws. Then the holding members 53 are fixed on the salient part 51 using screws. Next, the fixing part 54 is adapted ring-likely in the fixing groove 532. At last, the shaft 70 is passed through the penetrating bore 55, and the shaft is fixed in the cylinder body 50.

Figure 5:
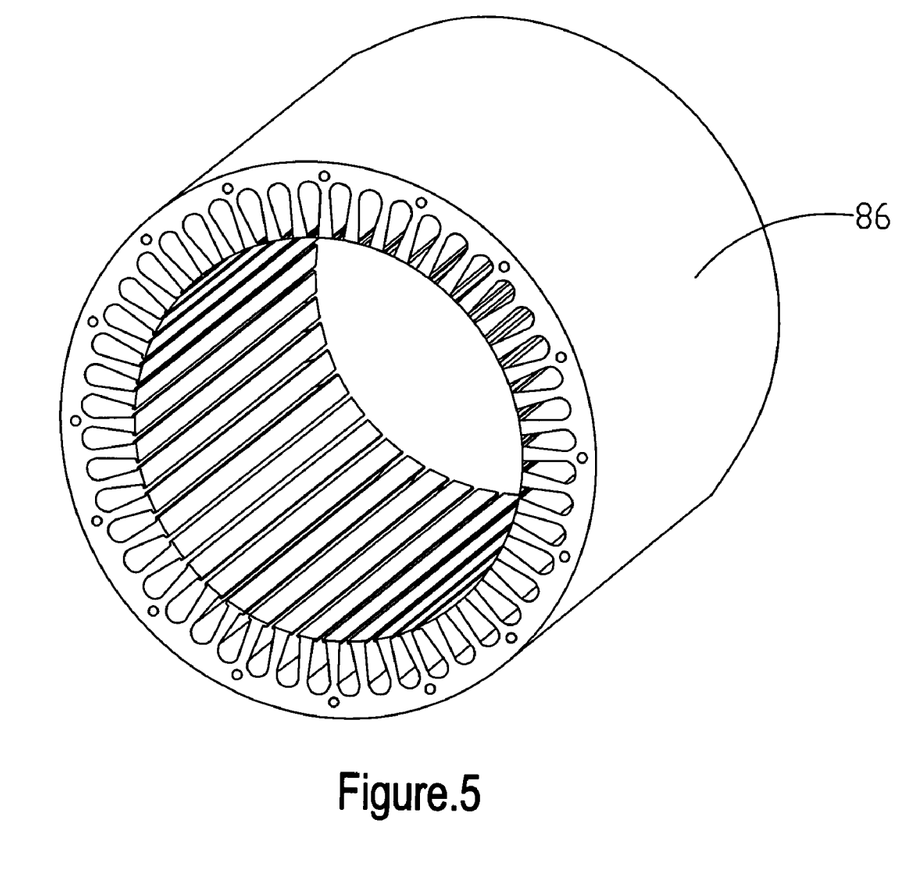
FIG. 5 is a three-dimensional view of a stator according to a preferred embodiment of the present invention.

Please refer to FIG. 5, which is a three-dimensional view of a stator according to a preferred embodiment of the present invention. As shown in the figure, because the rotor structure according to the present invention is a cylinder with greater height, in order to match the height of the rotor, the height of the stator 86 is increased accordingly. Thereby, the power generated by the generator is increased.

Thereinafter, a hollow rotor and a solid rotor, both with 25 KW, are used as an example.

Hollow Rotor:

Density=7648.77550507 Kg/m$^3$

Mass=77.17841548 Kg

Volume=0.01009030 m$^3$

Surface Area=1.38728780 m$^2$

Center of Mass: (m)
 X=0.00000000
 Y=−0.00002763
 Z=0.38584919

Inertia axis I and the torque P thereof (Kg*m$^2$) depends on center of mass:

Ix=(0.00000000, 0.00003194, 1.00000000)

Px=0.46763853

Iy=(1.00000000, 0.00000327, 0.00000000)

Py=1.25544266

Iz=(−0.00000327, 1.00000000, −0.00003194)

Pz=1.25552280

Inertia tensor (Kg*m²) depends on center of mass, and is aligned to the output coordinate system:

| | | |
|---|---|---|
| Lxx = 1.25544266 | Lxy = 0.00000000 | Lxz = 0.00000000 |
| Lyx = 0.00000000 | Lyy = 1.25552280 | Lyz = 0.00002516 |
| Lzx = 0.00000000 | Lzy = 0.00002516 | Lzz = 0.46763853 |

Inertia tensor (Kg*m²) depends on the output coordinate system:

| | | |
|---|---|---|
| lxx = 12.74573401 | lxy = 0.00000000 | lxz = 0.00000000 |
| lyx = 0.00000000 | lyy = 12.74581409 | lyz = −0.00079773 |
| lzx = 0.00000000 | lzy = −0.00079773 | lzz = 0.46763859 |

Solid Rotor:

Density=0.00000766 Kg/mm³

Mass=101.31892546 Kg

Volume=13225428.02917903 mm³

Surface Area=1182426.05507832 mm²

Center of Mass: (mm)
   X=0.00000000
   Y=−0.02104931
   Z=388.14861533

Inertia axis I and the torque P thereof (Kg*mm²) depends on center of mass:

Ix=(0.00000000, 0.00003280, 1.00000000)

Px=587526.73084614

Iy=(1.00000000, 0.00000327, 0.00000000)

Py=1504238.70107667

Iz=(−0.00000327, 1.00000000, −0.00003280)

Pz=1504318.82622727

Inertia tensor (Kg*mm²) depends on center of mass, and is aligned to the output coordinate system:

Lxx=1504238.70107095

Lxy=0.00026232

Lxz=0.00029995

Lyx=0.00026232

Lyy=1504318.82524681

Lyz=30.06863532

Lzx=0.00029995

Lzy=30.06863532

Lzz=587526.73183232

Inertia tensor (Kg*mm²) depends on the output coordinate system:

Ixx=16768881.95421773

Ixy=0.00026219

Ixz=0.00272831

Iyx=0.00026219

Iyy=16768962.03350187

Iyz=−797.73334274

Izx=0.00272831

Izy=−797.73334274

Izz=587526.77672404

Thus it can be seen that after the weight of the rotor in a permanent-magnet generator is reduced, the weight of a hollow rotor is lighter by 23.4% than the weight of a solid rotor, which, in turn, makes the moment of inertia of the rotor reduced by 16.5%. Thereby, the containing spaces 56 adapted in a rotor can certainly reduce the moment of inertia of the rotor.

Figure 6:
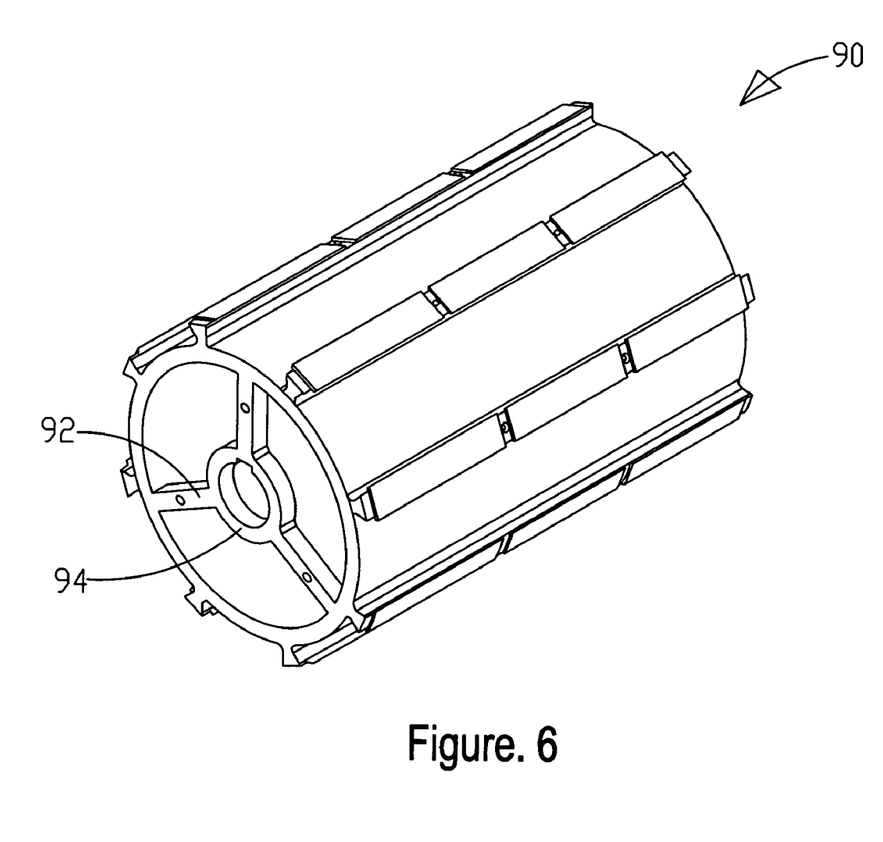
FIG. 6 is a three-dimensional view of a hollow body according to another preferred embodiment of the present invention.

Please refer to FIG. 6, which is a three-dimensional view of a hollow body according to another preferred embodiment of the present invention. As shown in the figure, this embodiment differs from the previous embodiment in that this embodiment does not adopt the cylinder body 50 as the main body of the rotor. Rather, this embodiment adopts the hollow body 90 as the main body of the rotor. At least a connecting part 92 is connected on the inner sidewall of the hollow body 90, and at least a shaft sleeve 94 is connected to the connecting part 92. In addition, a shaft passes through the shaft sleeve 94. Because the weight of the hollow body 90 is lighter than the weight of the cylinder body 50, therefore the moment of inertia of the rotor of this embodiment is smaller than that of previous embodiment. Accordingly, the power generation efficiency by the generator is enhanced.

To sum up, the present invention relates to a generator rotor structure comprising a cylinder body. A penetrating bore is adapted at the center of the cylinder body, and a shaft passes through a penetrating bore. A plurality of containing spaces is adapted between the sidewall of the penetrating bore and the outer sidewall of the cylinder body. The adjacent containing spaces include a connecting part, and a magnetic member is adapted on the outer sidewall of the cylinder body. The present invention can also be implemented according to another embodiment of the present invention, which comprises a hollow body. At least a connecting part is connected on the inner sidewall of the hollow body, and at least a shaft sleeve is connected to the connecting part. In addition, a shaft passes through the shaft sleeve, and magnetic members are adapted on the outer sidewall of the hollow body. Thereby, not only the assembly of the rotor structure is more simplified, but the weight and the moment of inertia of the rotor are also reduced to make the power generated by the generator enhanced at low wind speeds.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A generator rotor structure comprising:
   a cylinder body, a penetrating bore being adapted at the center of the cylinder body, a plurality of containing spaces being adapted between the sidewall of the penetrating bore and the outer sidewall of the cylinder body, and the adjacent containing spaces including a connecting part;
   a plurality of salient parts being disposed in an extending manner on the outer sidewall of the cylinder body;

at least one holding groove, being defined between adjacent salient parts;

at least one magnetic member, being adapted on the outer sidewall in the at least one holding groove of the cylinder body;

at least one holding member being adapted on top of each salient part;

at least one fixing groove being transversely adapted on the holding member;

a closed contour ring shaped fixing part is located in the fixing groove; and a shaft, passing through the penetrating bore.

2. The generator rotor structure of claim 1, wherein the shape of the sidewalls of the holding grooves can be arc-shaped or wedge-shaped.

3. The generator rotor structure of claim 1, wherein the bottom of each of the salient parts can be narrower than the top thereof.

4. The generator rotor structure of claim 1, wherein the bottom of the holding member is narrower than the top thereof.

5. The generator rotor structure of claim 1, wherein a first cover and a second cover are further included; a hole is adapted on each of the first cover and the second cover; the shaft passes through the holes; and the first cover and the second cover are covered on both sides of the cylinder body.

* * * * *